United States Patent [19]

Yasuda et al.

[11] Patent Number: 4,700,220
[45] Date of Patent: Oct. 13, 1987

[54] SOLID STATE COLOR IMAGING SYSTEM EMPLOYING SEPARATION OF HIGH AND LOW FREQUENCY COMPONENTS OF LUMINANCE DURING IMAGING

[75] Inventors: Syoichi Yasuda, Ikoma; Akihira Tokuno, Higashiosaka; Akihiko Futada, Nara; Yoshiharu Hayashi, Osaka; Kiyoshi Kobori, Nara; Takayoshi Ishida, Tenri, all of Japan

[73] Assignee: Sharp Kabushiki Kaisha, Osaka, Japan

[21] Appl. No.: 756,947

[22] Filed: Jul. 19, 1985

[30] Foreign Application Priority Data

Jul. 19, 1984 [JP] Japan .................... 59-150748

[51] Int. Cl.[4] ............ H04N 9/07; H04N 9/077
[52] U.S. Cl. ............................ 358/44; 358/43
[58] Field of Search ............ 358/41, 43, 44, 39

[56] References Cited

U.S. PATENT DOCUMENTS

| | | | |
|---|---|---|---|
| 4,149,182 | 4/1979 | Yamanaka et al. | 358/43 |
| 4,200,883 | 4/1980 | Yamanaka et al. | 358/44 |
| 4,205,336 | 5/1980 | Nagumo | 358/43 |
| 4,450,475 | 5/1984 | Ishikawa et al. | 358/44 |

Primary Examiner—James J. Groody
Assistant Examiner—Robert M. Bauer
Attorney, Agent, or Firm—Birch, Stewart, Kolasch & Birch

[57] ABSTRACT

A solid state color imaging sensor develops a green color signal and a red color signal in the first line of an odd field, and develops a green color signal and a blue color signal in the second line of the odd field. A first one line (1H) delay circuit is included in a signal processing circuit so as to produce a high frequency component signal of a luminance signal. A second one line (1H) delay circuit is included in the signal processing circuit so as to produce a low frequency component of the luminance signal and the color information signal.

4 Claims, 6 Drawing Figures

ODD FIELD
READ-OUT ROW

EVEN FIELD
READ-OUT ROW

ODD FIELD
READ-OUT ROW

EVEN FIELD
READ-OUT ROW

SOLID STATE COLOR IMAGING SYSTEM EMPLOYING SEPARATION OF HIGH AND LOW FREQUENCY COMPONENTS OF LUMINANCE DURING IMAGING

BACKGROUND OF THE INVENTION

1. Field of the Invention The present invention relates to a two-dimensional solid state color imaging system and, more particularly, to a solid state color imaging device which enhances resolution.

2. Description of the Prior Art

A single plate solid state color imaging system, having a two-dimensional solid state imaging panel, must have a color analyzing function for analyzing at least three colors. A color mosaic filter is normally disposed on the imaging panel so as to perform the spatial sampling. The color mosaic filter is generally constructed to produce a red color signal (R), a green color signal (G), and a blue color signal (B). The color mosaic filter array must be determined so that a high resolution is ensured.

In the color television system, the bandwidth of the color difference signal is selected narrower as compared with that of the luminance signal because the human beings can not recognize the color at the fine portion of the image. Thus, the color mosaic filter array is preferably designed so as to reduce the resolution of the color signal, and instead enhance the resolution of the luminance signal. Of the three color signals (R), (G) and (B), the green color signal (G) most effectively influences the luminance signal. Therefore, several color mosaic filter arrays have been proposed, in which the green filter ratio is greater than the red or blue filter ratio.

Further, a control circuit related to the above-mentioned color mosaic filter array has been proposed, which includes a one line (1H) delay circuit for ensuring clean imaging. However, the conventional control circuit can not ensure a clean imaging when the object has a great brightness variation along a vertical line. This is caused by the spurious signal. More specifically, the conventional system does not have high resolution in the vertical direction.

In order to minimize the generation of the spurious color signal, the engineering group of the present inventors has proposed a novel control system wherein a vertical contour signal is added to an interpolation signal (1H delayed signal.) Examples of the novel control system are shown in, for example, Japanese patent publication (Tokkaisho) No. 58-90884 (laid open on May 30, 1983) or Japanese patent publication (Tokkaisho) No. 58-99083 (laid open on June 13, 1983). However, the control system proposed in the above-mentioned Japanese patent publications is not suited for the practical use because the system power consumption is relatively high when the CCD delay line is employed. Further, there is a possibility that undesirable color mixing takes place in the above-mentioned system.

OBJECTS AND SUMMARY OF THE INVENTION

Object of the Invention

Accordingly, an object of the present invention is to provide a novel control system in a two-dimensional solid state color imaging device including a color mosaic filter. Another object of the present invention is to reduce the power consumption in a control system related to a two-dimensional solid state color imaging device.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

To achieve the above objects, pursuant to an embodiment of the present invention, a one line (1H) delay circuit is divided into two parts, first for the high frequency component of the luminance signal, and second for the low frequency component of the luminance signal and the color signal. More specifically, in a certain every other line period, first (green) and second (red) color signals are produced. The first (green) and third (blue) color signals are produced in the other every other line period. A first one line (1H) delay circuit functions to delay the high frequency component of the luminance signal, and a second one line (1H) delay circuit functions to delay the color signal and the low frequency component of the luminance signal.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
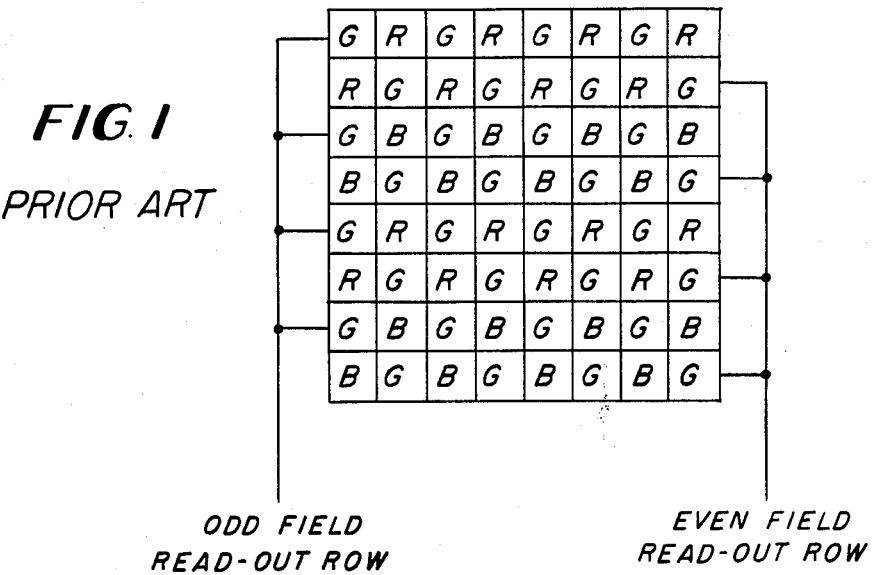
FIG. 1 is a plan view of the conventional color mosaic filter array.
Figure 2:
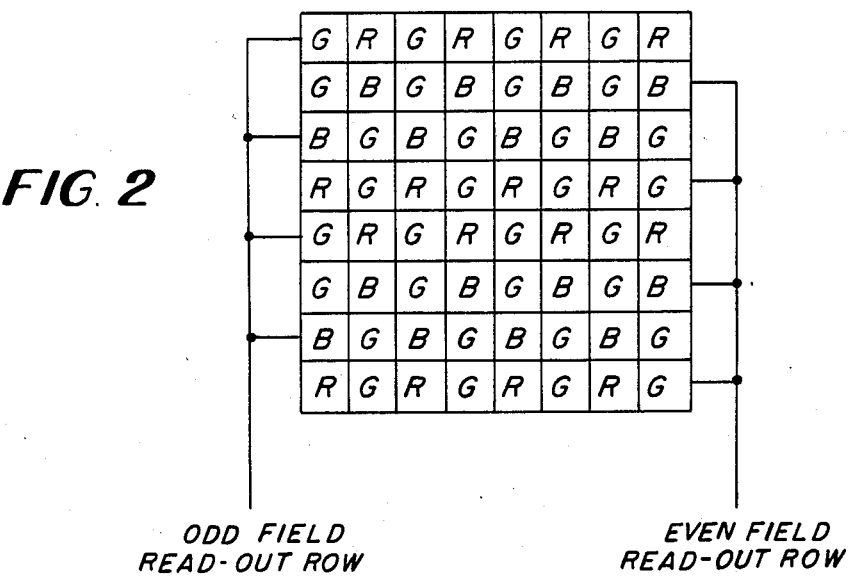
FIG. 2 is a plan view of a color mosaic filter array related to a solid state color imaging system of the present invention.

FIGS. 1 and 2 show examples of a color mosaic filter array related to a solid state color imaging device. These color mosaic filter arrays are designed for the solid state color imaging system which forms images in the interlaced manner. More specifically, in the odd field drive mode, the sensor elements related to the odd line color filters are effective for image formation. In the even field drive mode, the sensor elements related to the even line color filters are read out. In the both odd and even lines, the green filter (G), which is most effective to provide the luminance signal, is located at every other filter position. The red filter (R) and the blue filter (B) are positioned at every other interlaced line. Accordingly, for example in the odd field drive, the first odd line drive provides the green signal (G) and the red signal (R), and the second odd line drive provides the green signal (G) and the blue signal (B). The first odd line is referred to as a GR line hereinafter. The second odd line is referred to as a GB line hereinafter.

It is noted that the blue signal (B) is not obtained in the GR line. Therefore, it has been proposed to provide a one line (1H) delay circuit which functions to develop a blue signal (B) through the use of the signals obtained at the preceding GB line. In the same manner, the one line (1H) delay circuit functions to provide a red signal (R) when the GB line is currently driven.

However, the conventional one line (1H) delay system can not ensure a clean imaging when the object has a great brightness variation along the vertical line. This is caused by an undesirable spurious signal. That is, in the conventional system, the vertical resolution is not satisfactory.

In order to minimize the generation of the spurious color signal, the engineering group of the present inventors has proposed a compensation system wherein a vertical contour signal $G_0-G_1$ ($G_0$: green signal obtained from the currently driven line, $G_1$: green signal which is one line (1H) delayed) is applied to an interpolation signal (one line (1H) delayed signal). Examples of the above-mentioned compensation system are shown in Japanese Patent Publication (Tokkaisho) No. 58-99083, "SINGLE PLATE COLOR IMAGING DEVICE", published on June 13, 1983, or Japanese Patent Publication (Tokkaisho) No. 58-90884, "SINGLE PLATE COLOR IMAGING DEVICE", published on May 30, 1983.

Figure 3:
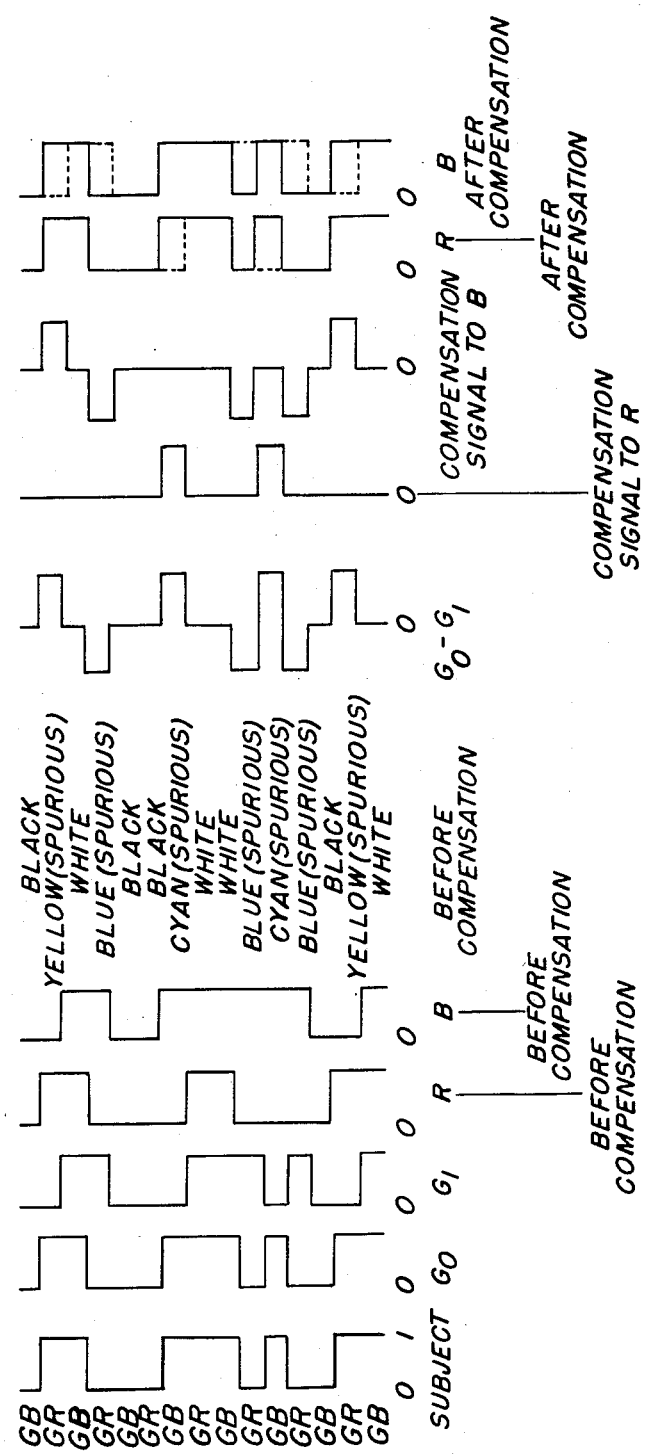
FIG. 3 is a waveform chart for explaining the conventional compensation circuit.

In order to facilitate a better understanding of the present invention, the above-mentioned compensation system will be first described with reference to FIG. 3, wherein the compensation system develops a compensation signal for minimizing the spurious phenomenon when the object has the brightness difference along the vertical line.

The compensation system shown in FIG. 3 will be shown in the formula as follows:

before compensation  GR line  GB line $$\begin{pmatrix} R \\ B \end{pmatrix} = \begin{pmatrix} R_0 & R_1 \\ B_1 & B_0 \end{pmatrix} \quad (1)$$

after compensation  GR line  GB line $$\begin{pmatrix} R \\ B \end{pmatrix} = \begin{pmatrix} R_0 & R_1 + G_0 - G_1 \\ B_1 + G_0 - G_1 & B_0 \end{pmatrix} \quad (2)$$

The suffix "0" represents the signal obtained from the currently driven line. The suffix "1" represents the signal delayed by one line (1H) period.

Figure 4:
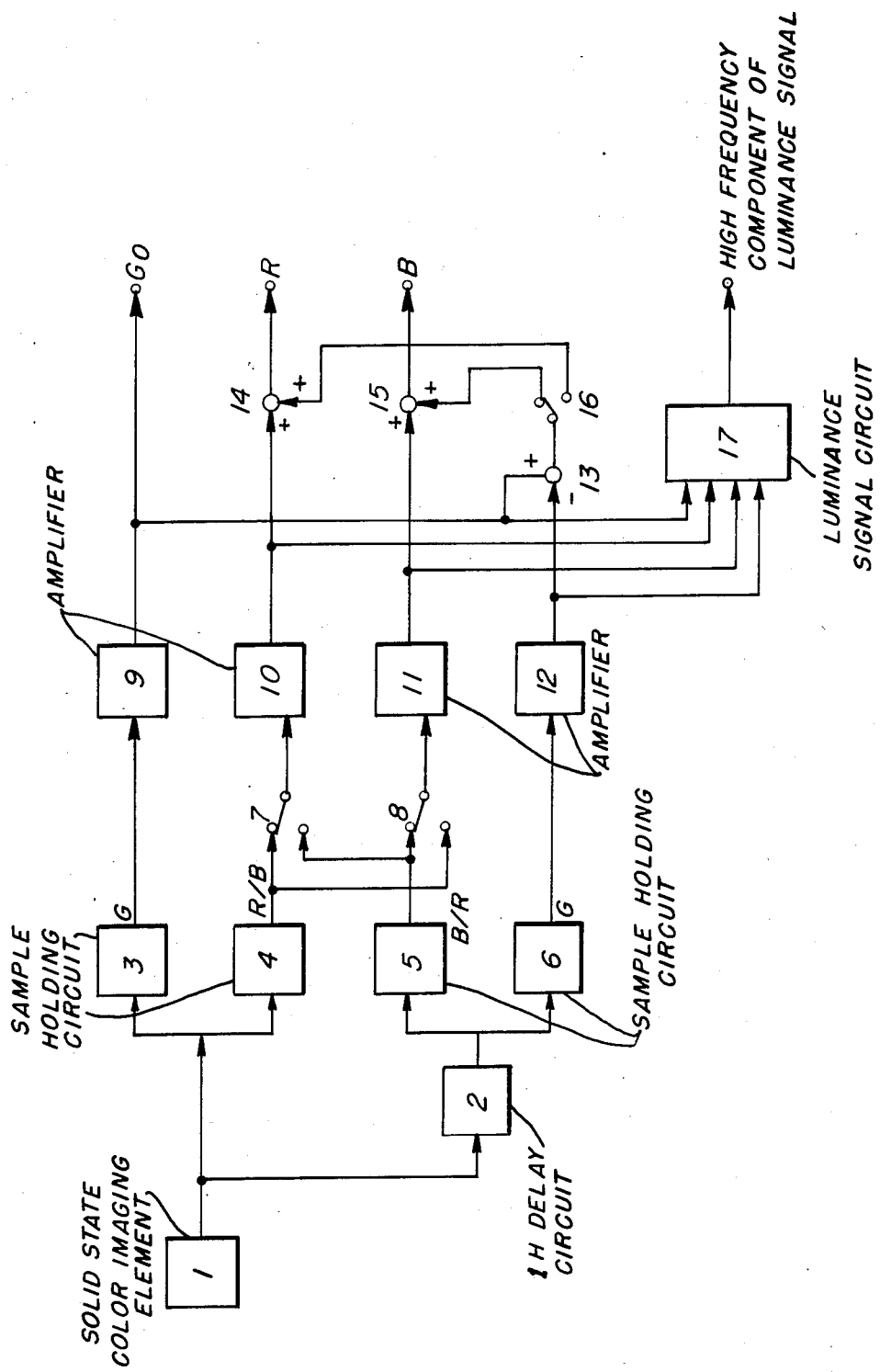
FIG. 4 is a block diagram of a control circit related to the conventional solid state color imaging device.

FIG. 4 shows an example of a signal processing circuit related to the conventional compensation system shown in the formula (2).

Color information signals developed from a solid state color imaging sensor 1, which includes a color mosaic filter as shown in FIG. 1 or FIG. 2, are divided into two lines. One line is applied directly to sample holding circuits 3 and 4, and the other line is applied to sample holding circuits 5 and 6 via a one line (1H) delay circuit 2. The sample holding circuits 3 and 6 function to extract a green color signal (G). The green color signal (G) developed from the sample holding circuit 3 is applied to an amplifier 9, and the green color signal (G) developed from the sample holding circuit 6 is applied to another amplifier 12. Output signals from the amplifiers 9 and 12 are introduced into a subtraction circuit 13 so as to subtract the output signal from the amplifier 12 from the output signal developed from the amplifier 9. The subtraction result ($G_0-G_1$) functions as the compensation signal shown in the above-mentioned formula (2).

The sample holding circuits 4 and 5 function to extract a red color signal (R) and a blue color signal (B) alternatively depending on the one line (1H) period. The red color signal (R) and the blue color signal (B) developed from the sample holding circuits 4 and 5 are applied to switching circuits 7 and 8, which are switched upon every one line (1H) period. An amplifier 10 receives only the red color signal (R) developed from the switching circuit 7. Another amplifier 11 receives only the blue color signal (B) developed from the switching circuit 8. A switching circuit 16 is synchronized with the switching circuits 7 and 8 so as to switch the output signal developed from the subtraction circuit 13. The output signal of the switching circuit 16 is applied to addition circuits 14 and 15. The addition circuit 14 functions to add the output signal from the switching circuit 16 to the output signal from the amplifier 10 in order to eliminate the spurious signal. The addition circuit 15 functions to add the output signal from the switching circuit 16 to the output signal from the amplifier 11 so as to eliminate the spurious signal. Further, the output signals of the amplifiers 9, 10, 11 and 12 are applied to a luminance signal circuit 17, which includes switching circuits and addition circuits, in order to obtain the high frequency component of the luminance signal.

The one line (1H) delay circuit 2 functions to delay both the high frequency component and the low frequency component of the color signal. Thus, if the CCD delay line is employed as the one line (1H) delay circuit, the power consumption cannot be minimized. Moreover, the color separation is not satisfactory because the color separation is carried out after the signal passes the delay circuit.

The present invention is to minimize the above-mentioned power consumption and the color mixing problem in the solid state color imaging device.

Figure 5:
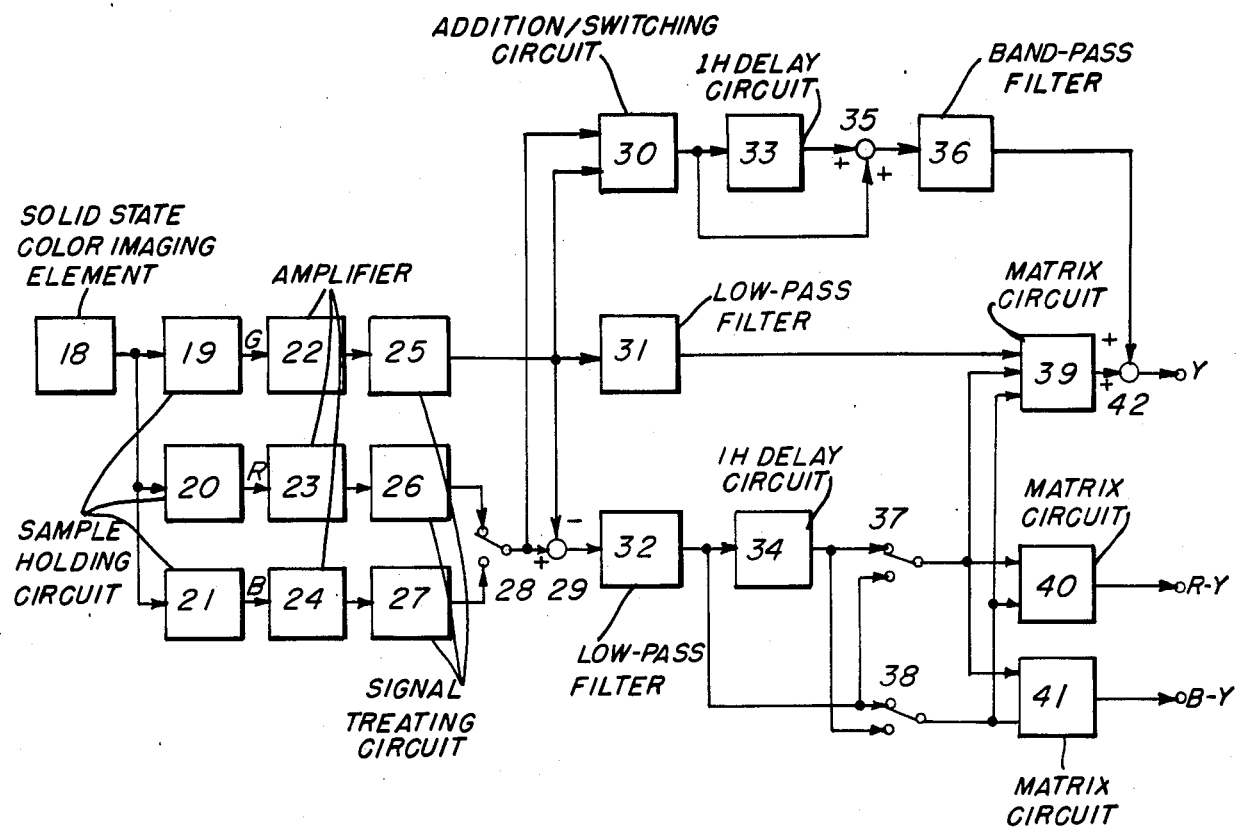
FIG. 5 is a block diagram of an embodiment of a control circuit of the present invention included in a solid state color imaging system.

FIG. 5 shows an embodiment of a signal processing circuit of the present invention related to the solid state color imaging device.

A solid state color imaging sensor 18 develops a red color signal (R), a green color signal (G) and a blue color signal (B) in accordance with the color mosaic filter alignment. The color signals developed from the solid state color imaging sensor 18 are separated by sample holding circuits 19, 20 and 21. More specifically, the sample holding circuit 19 develops a green color signal (G), the sample holding circuit 20 develops a red color signal (R), and the sample holding circuit 21 develops a blue color signal (B). The RGB signal level developed from the solid state color imaging element 18 varies depending on the spectral response of the color mosaic filter, and the color temperature difference of the light source. In order to match the RGB signal level, and to amplify the color signals to a desired level, amplifiers 22, 23 and 24 are provided. Signal processing circuits 25, 26 and 27 are connected to the amplifiers 22, 23 and 24 so as to conduct the $\gamma$ modification, the black clip, the white clip, etc. which are required in the video camera system.

Due to the color filter array, the red color signal (R) and the blue color signal (B) are developed every other one line (1H) from the solid state color imaging sensor 18. A switching circuit 28 is switched upon every one line (1H) period so as to pass either the red color signal (R) developed from the signal processing circuit 26 or the blue color signal (B) developed from the signal processing circuit 27. More specifically, in the GR line, the switching circuit 28 develops the red color signal (R), and in the GB line, the switching circuit 28 develops the blue color signal (B). The signal developed from the switching circuit 28 will be referred to as an R/B signal hereinbelow.

The green color signal (G) developed from the signalprocessing circuit 25 and the R/B signal developed from the switching circuit 28 are applied to an addition/switching circuit 30. A first one line (1H) delay circuit 33 is connected to the addition/switching circuit 30. An addition circuit 35 receives the current color signal developed from the addition/switching circuit 30, and the one line (1H) delayed color signal developed from the one line (1H) delay circuit 33. An output signal of the addition circuit 35 is applied to a band-pass filter 36 so as to extract the high frequency component of the luminance signal.

The green color signal (G) developed from the signalprocessing circuit 25 and the R/B signal developed from the switching circuit 28 are further applied to a subtraction circuit 29 so as to obtain an $R-G_R$ signal in the GR line, and a $B-G_B$ signal in the GB line. The output signal developed from the subtraction circuit 29 is applied to a low-pass filter 32. A second one line (1H) delay circuit 34 is connected to the low-pass filter 32. Switching circuits 37 and 38 are connected to receive the current color signal developed from the low-pass filter 32 and the one line (1H) delayed signal developed from the one line (1H) delay circuit 34. The signal applied to the switching circuits 37 and 38 is expressed as follows, where 0H means the current color signal developed from the low-pass filter 32, and 1H means the one line (1H) delayed signal developed from the one line (1H) delay circuit 34.

|  | GR line | GB line |
|---|---|---|
| 0H (current) | $R - G_R$ | $B - G_B$ |
| 1H (1H delayed) | $B - G_B$ | $R - G_R$ |

The switching circuits 37 and 38 are switched upon every one line (1H) period so that the switching circuit 37 develops an $R-G_R$ signal, and the switching circuit 38 develops a $B-G_B$ signal.

The green color signal (G) developed from the signal processing circuit 25 is further applied to another low-pass filter 31. An output signal ($G_O$ signal) developed from the low-pass filter 31 is introduced into a matrix circuit 39. The matrix circuit 39 receives, in addition to the signal $G_O$, the $R-G_R$ signal developed from the switching circuit 37, and the $B-G_B$ signal developed from the switching circuit 38 so as to develop a luminance signal $Y_L$.

The luminance signal can be expressed as follows through the use of the above-mentioned green color signal $G_O$, and the red, blue signals shown in the formula (2).

In GR line:

$$Y = 0.59\, G_0 + 0.30\, R_0 + 0.11(B_1 + G_0 - G_1) \quad (3)$$

$$= G_0 + 0.30(R_0 - G_0) + 0.11(B_1 - G_1)$$

In GB line:

$$Y = 0.59\, G_0 + 0.30(R_1 + G_0 - G_1) + 0.11\, B_0 \quad (4)$$

$$= G_0 + 0.30(R_1 - G_1) + 0.11(B_0 - G_0)$$

When the green color signal in the GR line is expressed as $G_R$, and the green color signal in the GB line is expressed as $G_B$, the luminance signal $Y_L$ can be expressed as follows through the use of the formulas (3) and (4).

$$Y_L = G_O + 0.30(R - G_R) + 0.11(B - G_B) \quad (5)$$

The matrix circuit 39 performs the calculation in accordance with the formula (5) to obtain the luminance signal $Y_L$.

Matrix circuits 40 and 41 receive the $R-G_R$ signal developed from the switching circuit 37, and the $B-G_B$ signal developed from the switching circuit 38, whereby the matrix circuit 40 develops a color difference signal $R-Y$, and the matrix circuit 41 develops a color difference signal $B-Y$. The color difference signals $R-Y$, and $B-Y$ can be expressed as follows.

In GR line:

$$R - Y = R_0 - [G_0 + 0.30(R_0 - G_0) + 0.11(B_1 - G_1)]$$

$$= 0.70(R_0 - G_0) - 0.11(B_1 - G_1)$$

$$B - Y = (B_1 + G_0 - G_1) - [G_0 + 0.30(R_0 - G_0) + 0.11(B_1 - G_1)]$$

$$= 0.89(B_1 - G_1) - 0.30(R_0 - G_0)$$

In GB line:

$$R - Y = (R_1 + G_0 + G_1) - [G_0 + 0.30(R_1 - G_1) + 0.11(B_0 - G_0)]$$

$$= 0.70(R_1 - G_1) - 0.11(B_0 - G_0)$$

$$B - Y = B_0 - [G_0 + 0.30(R_1 - G_1) + 0.11(B_0 - G_0)]$$

$$= 0.89(B_0 - G_0) - 0.30(R_1 - G_1)$$

Consequently, the color difference signals are expressed as follows.

$$R - Y = 0.70(R - G_R) - 0.11(B - G_B) \quad (6)$$

$$B - Y = 0.89(B - G_B) - 0.30(R - G_R) \quad (7)$$

The matrix circuit 40 performs the calculation in accordance with the formula (6) to develop the color difference signal $R-Y$. The matrix circuit 41 performs the calculation in accordance with the formula (7) so as to obtain the color difference signal $B-Y$.

An addition circuit 42 receives the low frequency component of the luminance signal developed from the matrix circuit 39, and the high frequency component of the luminance signal developed from the band-pass filter 36. The mixed signal is developed from the addition circuit 42 as the luminance signal Y.

As discussed above, the signal processing circuit of the present invention includes signal processing blocks which performs calculation in accordance with the formulas (5), (6), and (7). The most effective portion of the signal processing circuit of the present invention is the first one line (1H) delay circuit 33, which treats the high frequency component of the luminance signal, and the second one line (1H) delay circuit 34, which treats the low frequency component of the luminance signal and the color signals. The separate one line (1H) delay circuits provide the following advantages.

(i) Delay Circuit for Low Frequency Component

Normally, a CCD delay line is used as a delay circuit for the low frequency component. If the transfer frequency in the CCD delay line is f, the transfer bandwidth is proportional to the transfer frequency, and is represented as f/2 in view of the sampling theorem of Nyquist. The power consumption in the CCD delay line is mainly caused by the driver circuit for the CCD. The power consumption in the driver circuit is proportional to the transfer frequency f because the CCD delay line is a capacitive load. That is, the power consumption in the CCD delay line increases as the transfer frequency increases.

For example, when the solid state imaging sensor is driven by a driving signal having a frequency of 7.16MHz, and when the color mosaic filter shown in FIG. 1 or FIG. 2 is disposed in front of the solid state imaging sensor the sampling frequency of the color signal is 3.58MHz. Thus, the bandwidth of the color signal is 1.79 MHz due to the sampling theorem of Nyquist. In the NTSC color television system, the color signal is required to have the bandwidth of atleast about 0.5 MHz. Thus, the transfer frequency in the CCD delay line can be reduced from 3.58 MHz to 1.79 MHz, where the bandwidth of the color signal is 0.9 MHz. That is, the power comsumption can be reduced to a half in the CCD delay line for the low frequency component.

In the conventional system, the high frequency component and the low frequency component are delayed by a same delay circuit. In this case, the bandwidth of the delay circuit should be determined in accordance with the high frequency component of the signal.

(ii) Delay Circuit for High Frequency Component

Figure 6:
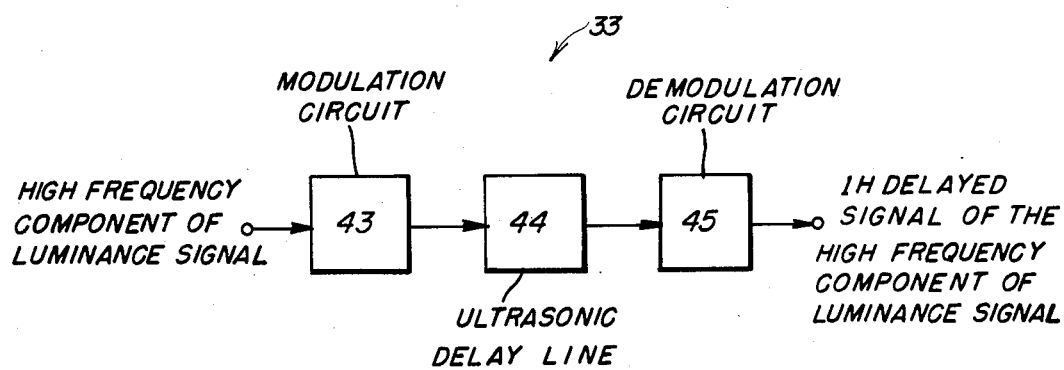
FIG. 6 is block diagram of an example of a high frequency component delay circuit included in the control circuit of FIG. 5.

It is not advantageous to employ the CCD delay line as the delay circuit for the high frequency component signal. The ultrasonic delay line is effective for the delay circuit for the high frequency component. FIG. 6 shows an embodiment of a delay circuit for the high frequency component, which includes an ultrasonic delay line. The delay circuit of FIG. 6 includes a modulation circuit 43, an ultrasonic delay line 44, and a demodulation circuit 45. The ultrasonic delay line does not consume any power. The power consumption at the modulation circuit 43 and the demodulation circuit 45 is not dependent upon on the carrier wave frequency. That is, the delay circuit of FIG. 6 has a fixed power consumption without regard to the driving frequency of the solid state imaging sensor.

The power consumption at the CCD delay circuit is less than that at the ultrasonic delay circuit when the frequency of the driving signal to be applied to the solid state imaging element is relatively low (low resolution). Contrarily, the power consumption at the CCD delay circuit is greater than that at the ultrasonic delay circuit when the driving signal frequency is relatively high (high resolution). Accordingly, the ultrasonic delay circuit is effective to minimize the power consumption when it is used at the high frequency signal portion.

When the color mosaic filter shown in FIG. 1 is employed, wherein the green filter is aligned in a stripe fashion in each field, no problem occurs even when the object has the vertical strips with the interval substantially corresponding to the driving frequency of the solid sate imaging element. However, when the color mosaic filter shown in FIG. 2 is employed, wherein the green filter is aligned in a checked fashion in each field, there is a possibility that false horizontal strips appears when the object has the vertical strips with the interval substantially corresponding to the driving frequency of the solid state imaging element. In order to minimize the occurrence of the above-mentioned false horizontal strips, the following formula (8) is used instead of the formula (5).

$$Y = (1-\alpha)G_0 + \alpha G_1 + 0.30(R - G_R) + 0.11(B - G_B) \qquad (8)$$

The constant $\alpha$ ( $0 < \alpha < 1$ ) should be determined with reference to the above-mentioned phenomena and the vertical resolution.

In order to carry out the formula (8), additional delay circuit for the low frequency green signal is required.

The invention being thus described, it will be obvious that the same may be varied in many ways. Such variations are not to be regarded as a departure from the spirit and scope of the invention, and all such modifications are intended to be included within the scope of the following claims.

What is claimed:

1. A solid state color imaging system comprising:
   a solid state color imaging sensor which develops first and second color signals during even lines of scanning, and develops first and third color signals during odd lines of scanning;
   signal processing means responsive to said color imaging sensor for separating said first and second color signals from each other and said first and third color signals from each other and for signal processing said first, second and third color signals
   first means for deriving a first current color signal including a high frequency component of a luminance signal from the signals developed by said signal processing means;
   a first one line (1H) delay circuit including an ultrasonic delay line which delays the current color signal including only the high frequency component of the luminance signal in response to the current color signal developed by the first means for deriving;
   second means for deriving a second current color signal including a low frequency component of the luminance signal and modified color signals containing said second and third color signals from the signals developed by said signal processing means;
   a second one line (1H) delay circuit including a charge coupled device (CCD) delay line which delays the low frequency component of the luminance signal and said second current in response to said second current color signal developed by said second means for deriving.

2. The solid state color imaging system of claim 1, wherein said first color signal is a green color signal, said second color signal is a red color signal, and said third color signal is a blue color signal.

3. A solid state color imaging system comprising:
   a solid state color imaging sensor which develops a green color signal and a red color signal in odd lines of scanning, and develops a green color signal and a blue color signal in even lines of scanning;

three parallel sample holding circuits, connected to said solid state color imaging sensor, each being assigned to a respective one of said green, red and blue color signals;

an addition/switching circuit, connected to receive output signals developed from said three parallel sample holding circuits;

a first one line (1H) delay circuit connected to said addition/switching circuit;

an addition circuit connected to receive output signals of said addition/switching circuit and said first one line (1H) delay circuit;

a band-pass filter which receives an output signal from said addition circuit and develops a luminance signal;

a switching circuit connected to said sample holding circuits assigned to said red and blue color signals;

a subtraction circuit which subtracts the signal developed from said sample holding circuit assigned to said green color signal from an output signal of said switching circuit;

a low-pass filter connected to said subtraction circuit;

a second one line (1H) delay circuit connected to said low-pass filter; and a matrix circuit which combines output signals of said low-pass filter and said second one line (1H) delay circuit so as to obtain the low frequency component of the luminance signal and the color information signal.

4. A solid state color imaging system comprising:

a solid state color imaging sensor which develops a sequential train of first, second and third color signals;

signal processing means, responsive to said color imaging sensor, for separating said first, second and third color signals from said sequential train and performing signal processing on said first, second and third color signals;

a first delay circuit which delays a current color signal including only a high frequency component of a luminance signal through the use of the signals developed from said signal processing means; and a second delay circuit which delays a low frequency component of the luminance signal and color signals through the use of the signals developed from said signal processing means.

* * * * *